Jan. 29, 1957  J. H. BORDEN  2,779,439
AUTOMATIC ELEVATOR CURRENT OPERATED BY-PASS CONTROL
Filed March 25, 1955
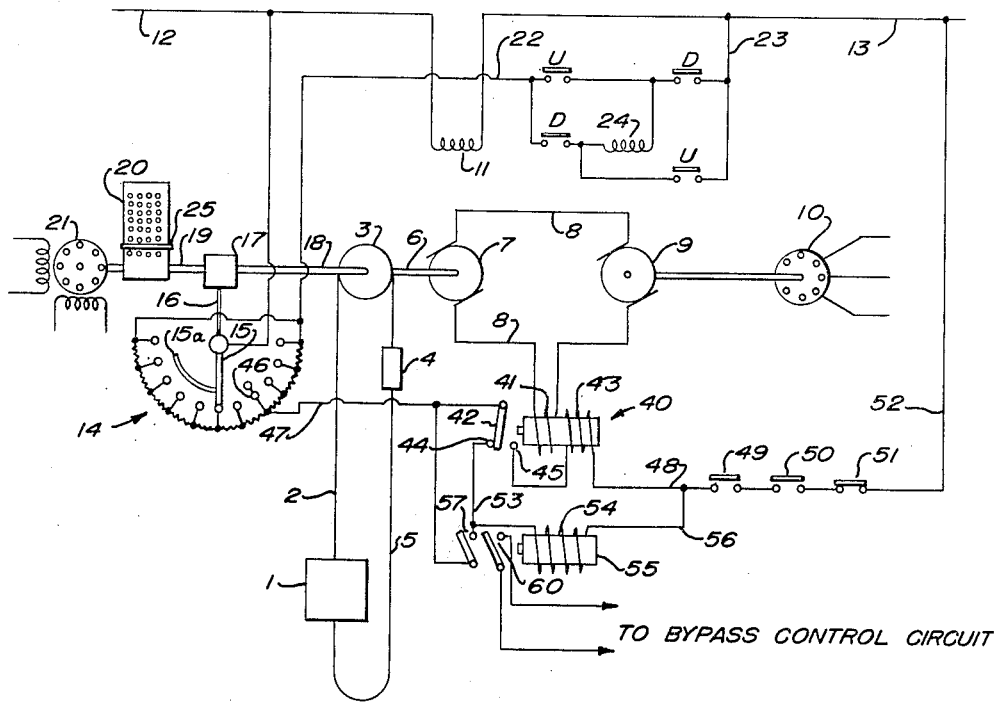
_Fig-I_
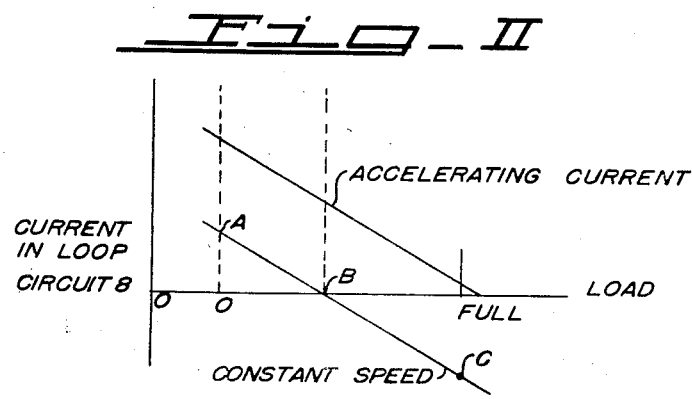
_Fig-II_
INVENTOR.
JOSEPH H. BORDEN
BY
Marshall, Marshall & Hasting
ATTORNEYS

United States Patent Office 2,779,439
Patented Jan. 29, 1957

2,779,439

AUTOMATIC ELEVATOR CURRENT OPERATED BY-PASS CONTROL

Joseph H. Borden, Toledo, Ohio, assignor to Haughton Elevator Company, Toledo, Ohio, a corporation of Ohio Application March 25, 1955, Serial No. 496,670

9 Claims. (Cl. 187—29)

This invention relates to automatic elevators and in particular to means for measuring the passenger or freight load as the elevator leaves each floor in its travel toward a terminal floor at which the passengers or freight are to be discharged from the car.

Elevators for commercial buildings are regularly supplied with by-pass control means so that an attendant, whose car is filled to capacity, may by-pass registered hall calls and proceed directly to a terminal floor to discharge his load of passengers or freight. These by-passing control means are ordinarily used in the taller office buildings, where, during rush periods at the noon hour and at the close of the business day, the elevator cars often become fully loaded at the first few stops on a downward trip and then by-pass the remaining down hall calls in proceeding to the terminal floor.

When the elevators are to be operated by the passengers themselves, as in completely automatic or non-attendant systems, some means must be provided to weigh the passenger load to determine when the car is loaded and should by-pass down hall calls. It has often been proposed to employ load weighing equipment between the supporting cables for a car and the car itself and to use such indications of weight in various control functions of the car. Such a system is satisfactory for an elevator serving a small number of floors or one in which some means is provided to attach the compensating cable to the supporting cable without imposing the load of the compensating cable on the load weighing device. The compensating cable load on the car varies from nearly zero when the car is at the lowest floor to a maximum when the car is at the top floor. Attempts to avoid loading the weighing device with the compensating cable weight usually leads to rather complicated structure in the elevator car and its supporting members.

The principal object of this invention is to provide means for measuring the load in an elevator car without requiring alterations in the car or its support and without interference from the weight of the compensating cable.

Another object of the invention is to provide means for weighing the passenger load as the car leaves each floor and to cause the car to by-pass further hall calls in the event that its load exceeds a predetermined amount.

Another object of the invention is to provide means for measuring the passenger load in an elevator by measuring the current flow to the driving motor as the elevator system is being accelerated at a definite rate.

More specific objects and advantages are apparent from the following description of a preferred form of the invention.

According to the invention the current coil of a current measuring relay is included in the loop circuit between the armature of a direct current elevator drive motor and the armature of a variable voltage generator supplying power to the elevator drive motor. Acceleration pattern control means are provided for controlling the voltage of the variable voltage generator during acceleration from stop to full speed operating condition. The current flow in the loop circuit between the drive motor and generator is measured at a particular instant in the acceleration cycle and the magnitude of the current at that instant is used as a measure of the load in the car and determines whether or not the car shall by-pass further hall calls or not. In a preferred form of the invention the current measuring relay prepares circuits either to a holding coil of its own or to a second relay depending upon whether or not the armature current is sufficient to energize the current measuring relay. At the predetermined point in the acceleration cycle the circuit is energized and if the current flow in the armature circuit is under a certain minimum amount the second relay is energized so as to condition the by-pass control to by-pass further calls. If the armature current exceeds the certain amount the current measuring relay conditions the circuit so that the measuring relay remains energized and definitely prevents the second relay from being energized to by-pass further calls.

A preferred form of the invention is illustrated in the accompanying drawings.

In the drawings:

Figure I is a generally schematic diagram of a elevator system including the improved control means.

Figure II is a drawing in the nature of a graph illustrating the principle of operation of the improved control means.

In an automatic passenger elevator system embodying the invention an elevator car 1 is suspended by cables 2 from a drive pulley 3. The cables 2 after passing over the pulley 3 are connected to a counterweight 4. A compensating cable 5 attached to the bottom of the counterweight 4 runs to the bottom of the hatchway and then up to the car. As elevators are ordinarily constructed the weight of the counterweight 4 exceeds the weight of the empty car 1 by approximately forty percent of the normal load to be carried in the car 1. Thus, if the car 1 carries forty percent of its normal full load the system is substantially in equilibrium with no tendency for the elevator with its partial load to either rise or fall in the shaft.

The drive pulley 3 may be mounted on an armature shaft 6 of an elevator drive motor 7. The drive motor 7 is connected in a loop circuit 8 to a variable voltage generator 9 that is driven at constant speed by an alternating current motor 10. The drive motor 7 has its field 11 continuously energized from power leads 12 and 13 while the generator 9 is energized from the leads 12 and 13 by way of a rheostat control 14. To control the speed of the motor 7 by varying the voltage of the generator 9 a movable arm 15 of the rheostat 14 is driven by an output shaft 16 of a differential gear 17 that has one input shaft 18 connected directly or through gearing to the drive pulley 3 or armature shaft 6 of the drive motor 7. The other input shaft 19 of the differential 17 is connected through a floor selector machine 20 to an advance motor 21. The direction of travel is selected by relay contacts U or D arranged in leads 22 and 23 that connect a field 24 of the generator 9 to the rheostat 14 and to the supply lead 13.

The advance motor 21 that drives the floor selector machine 20 is preferably a slow speed synchronous motor that can stop and start practically instantly. In the operation of an elevator system using this type of control the advance motor 21 is arranged to drive a carriage 25 of the floor selector machine 20 at a constant rate of speed toward the contacts representing the destination floor of the car 1. The advance motor 21 is arranged to start as soon as the direction selector switches U or D close to complete the circuit through the rheostat 14 and the field 24 of the variable voltage generator 9. Since at the start of a run the elevator 1 and its drive motor 7 are standing still when the advance motor 21 starts running at full speed the advance motor drives the floor selector carriage 25 and the input shaft 19 of the differential 17 so as to rotate the contact making arm 15 of the rheostat in the up direction so as to reduce the resistance in series with the field 24 and thereby increase the voltage output of the variable voltage generator 9. This causes a corresponding acceleration of the drive motor 7 so that the elevator accelerates and drives the input shaft 18 of the differential in a direction tending to cancel the advance motor drive and stop the output shaft 16 and rheostat arm 15. Equilibrium is reached when the speed of the elevator drive motor 7 matches the speed of the advance motor 21 at which time the advance motor and carriage 25 lead the equivalent position of the elevator car 1 by the required slow down distance which may be in the order of one-half to two floors of travel in a modern high speed elevator system. When this normal running speed condition is reached the contact arm 15 is at or near the end of the rheostat travel. The arm goes toward one end for up travel and toward the other end for down travel. A slight overrun on the rheostat is provided so that equivalent speeds may be reached before the rheostat arm 15 reaches the end of its travel.

When the floor selector machine carriage 25 reaches the selector machine contacts corresponding to the floor at which the next stop is to be made the advance motor 21 is immediately stopped with the carriage 25 centered over the contacts for that floor. This stops the input shaft 19 of the differential 17 so that the continuing motion of the drive motor 7 causes the output shaft 16 of the differential to rotate the arm 15 back toward its center position. As it rotates toward its center position it decreases the current flow through the generator field 24 thereby decreasing the voltage and smoothly decelerating the car in preparation for a stop at the floor. Leveling switches, not shown, are included in the usual elevator installation to control the final stopping of the car to bring it level with the floor.

The amount of current required in the loop circuit 8 between the drive motor 7 and the variable voltage generator 9 is determined by the load in the elevator car. This current requirement for downward travel for the elevator car is illustrated in Figure II. As shown in this figure, when there is no load in the car and the elevator is running down at a constant speed the motor 7 requires a certain amount of current flow represented by point A at the intersection on the no-load line and a line representing the current required at steady speed. This amount of current represents the power required to elevate the excess weight of the counterweight 4 over the weight of the empty car.

If the load in the car is approximately forty percent of the rated capacity of the car then the weight of the car 1 and its part load is substantially equal to the weight of the counterweight 4 so that very little current is required to keep the system moving at a constant speed. This condition is indicated by point B in the diagram. Should the car be fully loaded, as is the case in down travel during heavy traffic conditions, the load in the car tends to drive the car downwardly as well as overcoming the weight of the counterweight 4. Under this condition the elevator drive motor 7 operates as a generator to feed power back to the variable voltage generator 9 and thus back to the power line. This condition where the drive motor 7 acts as a brake is indicated by point C on the line in the graph or diagram, Figure II.

During acceleration from a stop additional current is required by the drive motor 7 to overcome the inertia of the system and provide the required rate of acceleration. The current flow required during downward acceleration is indicated by the second solid line of Figure II located some distance up above the steady speed current requirement and marked accelerating current. The spread between the two lines in the vertical direction represents the armature current required by the motor 7 to overcome the inertia forces and provide the required acceleration. Whether or not the accelerating current reaches zero at full load depends upon the required acceleration of the car, and the mass of the car together with the counterweight and drive motor, as compared to the unbalanced weight of the loaded car over the weight of the counterweight and to a very minor extent upon the friction in the system. For example, if the counterweight 4 is arranged to counterbalance the weight of the car 1 plus forty percent of its net capacity passenger load and if the required acceleration be one-tenth of the acceleration of gravity, i. e., 3.2 feet per second and if sixty percent of the net passenger load, the excess weight, is equal to one-tenth of the effective mass of the car plus its load plus the mass of the counterweight 4 then the unbalanced load in the car (sixty percent of the full capacity load) is just sufficient to accelerate the system at the desired acceleration rate. In this assumed condition there would be no required armature current in the loop circuit when the car is accelerating and the motor 7 would operate as a brake when the car operates at constant speed.

If the mass or weight of the car and counterweight is greater than that assumed in the example the accelerating current for downward movement at full load will still be positive in that the generator will have to supply current to the motor to provide the desired acceleration rate. Likewise this condition will hold if the desired acceleration rate is greater than that assumed in the example even though the mass and unbalanced load be the same as that assumed.

In any case the armature current in the loop circuit 8 decreases or reverses as a full load condition of the elevator is approached. According to the invention advantage is taken of the fact that the accelerating current is small when the car is fully loaded and the actual current flow in the loop circuit during a particular part of the acceleration cycle is used as a measure of the load in the car.

Referring to Figure I again, the equipment for measuring the loop current as a measure of the load in the elevator car during downward travel is comprised of a current measuring relay 40 having a current coil 41 included in the loop circuit 8 of the motor and generator. The current measuring relay 40 is proportioned so that an armature 42 of the relay 40 is actuated whenever the current flow in the loop circuit is greater than the current flow resulting during acceleration at full load. Thus the relay 40 is energized during each downward start as long as the car is not fully loaded. The relay 40 is also provided with a voltage coil 43 and the armature 42 serves as or carries a contact element operating between a first stationary contact 44 and a second stationary contact 45. When the measuring relay 40 is energized it closes its contacts 42—45 so as to prepare a circuit from a rheostat contact point 46 through lead 47 and now closed contact points 42—45, the voltage coil 43 of the current measuring relay 40, then through a lead 48, contacts 49 of a down direction selector relay, contacts 50 of an advance motor relay and contacts 51 of a throw-over switch for selecting either manual or automatic operation. From the contacts 51 the circuit is taken through a lead 52 connected to the return lead 13. During downward acceleration as the advance motor 21 operates through the differential 17 to advance the rheosat arm 15 it closes the circuit to the contact 46 thus energizing the circuit just described. After once being made the contact 46 is held closed by an extension 15a of the rheostat arm 15 so as to maintain the circuit just described as long as the elevator is running in the down direction.

If the load in the elevator car 1 is great enough so that at the time the rheostat arm 15 closes or energizes the contact 46 there is insufficient armature loop current flowing to energize the current measuring relay 40 then the circuit is made from the contact 42 to contact 44, through lead 53, and voltage coil 54 of a second relay 55. From the other terminal of the voltage coil 54 current flows through a lead 56 to the lead 48 and through the contacts 49, 50 and 51 and lead 52 to the return lead 13. This energizes the second relay 55 which thereupon closes its contacts 57 to establish a holding circuit around the contacts 42—44 so that the relay 55 then remains energized until the circuit is broken either by stopping the car which breaks the circuit at the rheostat contact 46 or by opening the throwover switch contacts 51 or the directional contact switches or relay contacts 49 or 50.

When a second relay 55 is operated it also closes its contacts 60 to complete a circuit to the by-pass controls of the elevator system thereby conditioning the elevator control to by-pass further hall calls.

Preferably the contact 46 of the rheostat 14 is so located as to be energized just shortly after the car leaves a floor and at a time when the acceleration is maximum. At this time if the loop current is low, signifying a full load in the elevator car, the circuit is completed to energize the second relay 55 and thus energize the by-pass controls. This relay seals itself in so as to continue to by-pass calls until the car stops either in response to car button indicating that a passenger desires to leave a car or at the terminal floor. However, at each stop if the current flow in the loop circuit is greater, indicating less than capacity load, the current measuring relay 40 seals itself in since it is in operated condition when the contacts 46 close and it thereby prevents operation of the second relay 55 thus allowing the car to respond to further down calls.

It should be noted in this circuit if the current measuring relay 40 is deenergized at the time that the circuit is made by the rheostat arm 15 contacting the rheostat contact 46 and is later energized, that the subsequent energization of the current measuring relay 40 does not deenergize the by-pass control relay 55. Likewise, if the current measuring relay 40 is energized by its current coil when the circuit is first made the current measuring relay is then sealed in so that it remains energized until the next stop of the elevator thus preventing any false operation which would occur if the elevator were operating at about half load so that little current would be required to keep the system moving at constant speed.

This system provides, with a minimum of apparatus which may be easily added to existing elevator systems, means for measuring or indicating the loaded condition of an elevator car as each start is made and thus provides reliable apparatus for automatically determining when a loaded car should by-pass further hall calls. This system has the advantage that no changes whatsoever are required in the elevator car itself or in its support, and since it operates on the complete compensated system rather than on the force exerted between the cables and the car it operates the same whether the car be at the top terminal or near the bottom terminal since with a properly proportioned compensating cable 5 attached between the car 1 and counterweight 4 the driving force required for the car is the same in either condition.

Various modifications may be made in the circuits described without departing from the scope of the invention.

Having described the invention, I claim:

1. In an automatic elevator system, in combination, an elevator car and counterweight, a direct current drive motor for moving the elevator, a variable voltage generator connected in loop circuit to drive the drive motor, means for energizing the generator to provide a predetermined rate of change of voltage for accelerating the elevator whereby during acceleration the armature current from the generator to the motor varies with the load in the car and approaches a minimum for down acceleration with full load, a current relay connected in the loop circuit and responsive to the armature current, control means energized at a predetermined time during acceleration of the elevator, a by-pass relay, and circuit means energized by the control means and including the current relay and by-pass relay for causing the elevator to by-pass down hall calls in the event said current relay is not in operated condition upon energization of the control means.

2. In an automatic elevator system in which a counterbalanced elevator car is driven by a direct current motor connected in loop circuit with the variable voltage generator, and in which during starting of the car the generator voltage is varied at a predetermined rate so that the armature current of the motor and generator is a direct function of the load in the elevator and approaches a minimum for no load acceleration in the up direction and full load acceleration in the down direction, in combination, a first relay having a current coil in said loop circuit and having a voltage coil, a second relay, means including contacts of the first relay for preparing a circuit to the second relay when the first relay is deenergized, and a circuit to the voltage coil of the first relay when the first relay is energized, means energizing the prepared circuits at a predetermined point in the acceleration of the car, a holding circuit for the second relay, and means operated by the second relay for causing the car to by-pass registered hall calls.

3. In an automatic elevator system in which a counterbalanced elevator car is driven by a direct current motor connected in loop circuit with a variable voltage generator having a predetermined voltage-time pattern during acceleration, in combination, a first relay that has a current coil in said loop circuit and a voltage coil, a second relay, a control contact that is closed at a predetermined point in the acceleration of the motor, and circuit means including contact means on said first relay and said control contact for energizing the second relay if said control contact closes when the first relay is deenergized and for preventing energization of the second relay if the first relay is energized as the control contact closes and means controlled by the second relay for causing the elevator car to by-pass registered hall calls.

4. In an automatic elevator system in which a counterbalanced elevator car is driven by a direct current motor connected in loop circuit with a variable voltage generator having a predetermined voltage-time pattern during acceleration, in combination, a first relay, a second relay, a first coil on the first relay that is responsive to the magnitude of the current flow in the loop circuit, a voltage coil for each relay, means on the first relay for preparing a circuit to one or the other of said voltage coils depending upon the magnitude of the current in the loop circuit, means for energizing said circuit at a selected point in the acceleration period of the motor, means for holding the energized circuit closed, and contacts on the second relay adapted to cause the car to by-pass calls when the second relay is energized.

5. In an automatic elevator system in which a counterbalanced elevator car is driven by a direct current motor connected in loop circuit with a variable voltage generator, in combination, means for increasing the generator voltage according to pattern during acceleration, means for measuring the current in the loop circuit at a predetermined instant in the acceleration cycle, a first circuit, a second circuit, means for establishing one or the other of the circuits according to the magnitude of the loop current at the predetermined instant, and means responsive to the establishment of one of said circuits for causing the elevator car to by-pass hall calls.

6. In an automatic elevator system in which a counterbalanced elevator car is driven by a direct current motor connected in loop circuit with a variable voltage generator, in combination, means for varying the voltage of the generator according to a predetermined acceleration pattern, means for measuring the loop current during acceleration, a pair of control circuits, means for selectively preparing one of two control circuits according to the measured magnitude of the loop current, means for energizing the prepared circuit at a given instant in the acceleration pattern, and means responsive to the energization of a particular one of said control circuits for causing the car to by-pass hall calls.

7. In an automatic elevator system in which a counterbalanced elevator car is driven by a direct current motor connected in loop circuit with a variable voltage generator, in combination, a first relay having a current coil in said loop circuit and a voltage coil, a second relay having a voltage coil, contacts on said first relay for preparing a circuit to its voltage coil when it is energized and to the coil of the second relay when the first relay is deenergized, contacts on the second relay for completing a holding circuit for the second relay, a control circuit for energizing said circuits at a preselected time during the acceleration of the motor, and means controlled by the second relay for causing the car to by-pass registered hall calls.

8. In an automatic elevator system in which a counterbalanced elevator car is driven by a direct current motor connected in loop circuit with a variable voltage generator, in combination, a current measuring relay having a current coil in said loop circuit and a voltage coil, a second relay having a voltage coil, a circuit energized through generator controls at a preselected point in the acceleration period of the car, means on said current measuring relay for connecting said circuit to its voltage coil if said relay is energized by current flow in its current coil and for connecting said circuit to the second relay if said measuring relay is deenergized, and means on said second relay for holding it energized and for causing the car to by-pass hall calls.

9. In an automatic elevator system in which a counterbalanced elevator car is driven by a direct current motor connected in loop circuit with a variable voltage generator, in combination, a contact making control for varying the voltage of the generator according to a predetermined acceleration pattern, a first relay having a current coil connected in said loop circuit, a voltage coil on said first relay, contacts on said first relay for preparing a circuit to said voltage coil when the relay is energized, a second relay having a voltage coil, contact on the first relay for preparing a circuit to the second relay voltage coil when the first relay is deenergized, means for energizing said circuits when said contact making control reaches a preselected point in the acceleration pattern, contacts on the second relay in parallel with the contacts of the first relay for maintaining the circuit to the second relay, and means on the second relay for conditioning the elevator car to by-pass hall calls.

References Cited in the file of this patent
UNITED STATES PATENTS

| | | |
|---|---|---|
| 2,624,425 | Eames | Jan. 6, 1953 |
| 2,641,337 | Lund | June 9, 1953 |